United States Patent
Brook et al.

(10) Patent No.: US 7,036,148 B2
(45) Date of Patent: Apr. 25, 2006

(54) METHOD OF OPERATING AN INTRUSION DETECTION SYSTEM ACCORDING TO A SET OF BUSINESS RULES

(75) Inventors: Ashley Anderson Brook, Morrisville, NC (US); Nathaniel Wook Kim, Raleigh, NC (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 09/851,286

(22) Filed: May 8, 2001

(65) Prior Publication Data

US 2002/0169982 A1    Nov. 14, 2002

(51) Int. Cl.
G06F 21/24    (2006.01)
G06F 21/22    (2006.01)
G06F 21/20    (2006.01)

(52) U.S. Cl. .......................................... 726/25; 726/26
(58) Field of Classification Search ................. 713/201, 713/182
See application file for complete search history.

(56) References Cited

U.S. PATENT DOCUMENTS

| | | | |
|---|---|---|---|
| 5,278,901 A | 1/1994 | Shieh et al. ................... 380/4 |
| 5,519,717 A * | 5/1996 | Lorenzo et al. ............. 375/134 |
| 5,621,889 A | 4/1997 | Lermuzeaux et al. ....... 395/186 |
| 5,796,942 A | 8/1998 | Esbensen ............... 395/187.01 |
| 5,991,881 A | 11/1999 | Conklin et al. ............. 713/201 |
| 6,029,144 A | 2/2000 | Barrett et al. ................. 705/30 |
| 6,088,451 A | 7/2000 | He et al. ....................... 380/25 |
| 6,158,010 A | 12/2000 | Moriconi et al. ........... 713/201 |
| 6,167,520 A * | 12/2000 | Touboul ..................... 713/200 |
| 6,182,226 B1 * | 1/2001 | Reid et al. .................. 713/201 |
| 6,202,157 B1 | 3/2001 | Brownlie et al. ........... 713/201 |
| 6,209,101 B1 | 3/2001 | Mitchem et al. ............ 713/200 |
| 6,351,752 B1 * | 2/2002 | Cousins et al. ......... 707/103 R |
| 2001/0052080 A1* | 12/2001 | Dusenbury .................. 713/201 |
| 2002/0112185 A1* | 8/2002 | Hodges ....................... 713/201 |

FOREIGN PATENT DOCUMENTS

EP    0985995    3/2000
WO    WO00/07312    2/2000

OTHER PUBLICATIONS

Research Disclosure, No. 422118. Jun. 1999 "System for Detection of Intrusions Based on Sequence Number Irregularities" p. 881.
IBM Technical Disclosure Bulletin, V37, No. 05, May 1994 "Actively Slowing a CPU in Response to the Detection of a Signature String" pp. 419-421.

* cited by examiner

Primary Examiner—Gilberto Barron, Jr.
Assistant Examiner—Venkat Perungavoor
(74) Attorney, Agent, or Firm—Schmeiser, Olsen & Watts; David R. Irvin

(57) ABSTRACT

An intrusion detection system checks a list of business rules at predetermined update times, and determines whether any provision of the business rules has become newly operative since the last update time. Provisions of the business rules prescribe alterations to intrusion signatures, thresholds, actions, or weights that are appropriate to broader circumstances evident at the update time. Whenever a new provision is found to be operative, the effected signatures, thresholds, actions, or weights are altered accordingly.

22 Claims, 5 Drawing Sheets

METHOD OF OPERATING AN INTRUSION DETECTION SYSTEM ACCORDING TO A SET OF BUSINESS RULES

FILED OF THE INVENTION

The present invention applies generally to the field of computer security, and more particularly to a method of improving the operation of an intrusion detection system that protects a computer from intrusions by vandals such as hackers.

BACKGROUND

Computer-based activities are now subject to electronic vandalism. A vandal, who is sometimes called a hacker in this context, may attempt to intrude upon a computer in order to steal information in an act of industrial espionage, or to impede the operation of the computer by implanting a virus or by flooding the computer with bogus information, or to alter records to the detriment or the benefit of another party's interests or reputation.

Computers are often protected against hackers' intrusions by intrusion detection systems. An intrusion detection system observes characteristics of messages that flow from a network into a protected network attachment such as a computer, or that originate locally to the computer. These characteristics may be thought of as a fingerprint or a signature of an event, whether the event is benevolent, malicious, or inconsequential.

More specifically, a signature may include a particular pattern of bits, for example the pattern of bits that identifies logon-password failure. Associated with the signature there may be a threshold that differentiates between attempted intrusions and uneventful occurrences of the signature. For example, the signature may be required to occur J times in K minutes before an intrusion is suspected. Thus the signature "logon-password failure" may be judged to be suggestive of an intrusion attempt when the signature occurs more than five times in twenty minutes.

When the intrusion detection system observes activity that is suggestive of an intrusion, it attempts to minimize the damage done by the intruder. For example, the occurrence of more than five logon-password failures for a given computer account over a twenty-minute interval of time may be a sign that an unauthorized party is attempting to gain access to that account by guessing passwords. To block this unauthorized access, the account under attack may be locked.

Although today's intrusion detection systems provide a useful degree of protection, their effectiveness is limited by the static nature of the signatures and thresholds at their disposal. Once a signature associated with an intrusion has been defined and a threshold set, broader circumstances surrounding any attempted intrusion are not taken into account. This is unfortunate, because hackers' intrusions may have serious commercial or social consequences.

Thus there is a need to improve intrusion detection systems so that they may use the best available information, taking into account circumstances that surround evidence of attempted intrusions, in order to provide the best attainable protection against intruding vandals.

SUMMARY

The present invention improves the operation of an intrusion detection system by taking into account broader circumstances that surround evidence of an attempted intrusion.

In the description that follows, the concept of a signature mentioned above is enlarged here to encompass an intrusion set. An intrusion set may include a signature, a threshold, an action to be taken when occurrences of the signature cross the threshold, and a weight associated with the action.

At predetermined times, which are called here update times, the intrusion detection system checks a list, database, or other compilation of business rules. A determination is made, by evaluating validity conditions of the rules, as to whether a new provision of any of the business rules has become operative or gone into effect since the last update time. Provisions of the business rules prescribe alterations to the intrusion sets. These alterations reflect the broader circumstances at the time the provision becomes newly operative. Whenever a provision is found to be newly operative, a determination is made as to whether the newly operative provision applies to any of the intrusion sets. If the newly operative provision applies to an intrusion set, that intrusion set is altered accordingly.

For example, on the tenth day of a month, an illustrative intrusion set might include the signature "log-on password failure," the threshold "five occurrences in twenty minutes," the action "notify administrator," and a weight of "moderate," which the administrator might use to rank the importance of the notification. Suppose, however, that passwords are required to be changed on the first day of each new month, and that a flurry of logon-password failures normally occurs when passwords are changed. To enable the intrusion detection system to account for this, one of the business rules applicable to the illustrative intrusion set might be, for example, "on the first day of each month, set the logon-password-failure threshold to ten occurrences in twenty minutes." For this rule, the validity condition would be "on the first day of each month," and its provision or action would be "set the logon-password-failure threshold to ten occurrences in twenty minutes."

Automatically, on the first day of each month, the intrusion detection system would examine the set of business rules. The validity condition of the exemplary rule would be satisfied upon the occurrence of the first day of the month, and its provision—the prescribed change in the threshold of the illustrative intrusion set—would become newly operative. The intrusion set would be altered accordingly. In this same example, another business rule might be to set the threshold to five occurrences in twenty minutes on the second day of each month.

Thus, by altering intrusion sets in accordance with business rules or policies, the present invention improves the operation of an intrusion detection system by enabling the intrusion detection system to adapt to broader circumstances that surround potential intrusions. These and other aspects of the invention will be more fully appreciated when considered in the light of the following detailed description and drawings.

DETAILED DESCRIPTION

The present invention improves the operation of an intrusion detection system by enabling the intrusion detection system to alter intrusion sets in accordance with business rules, and thereby to adapt to broader circumstances that accompany evidence that is suggestive of an intrusion.

Figure 1:
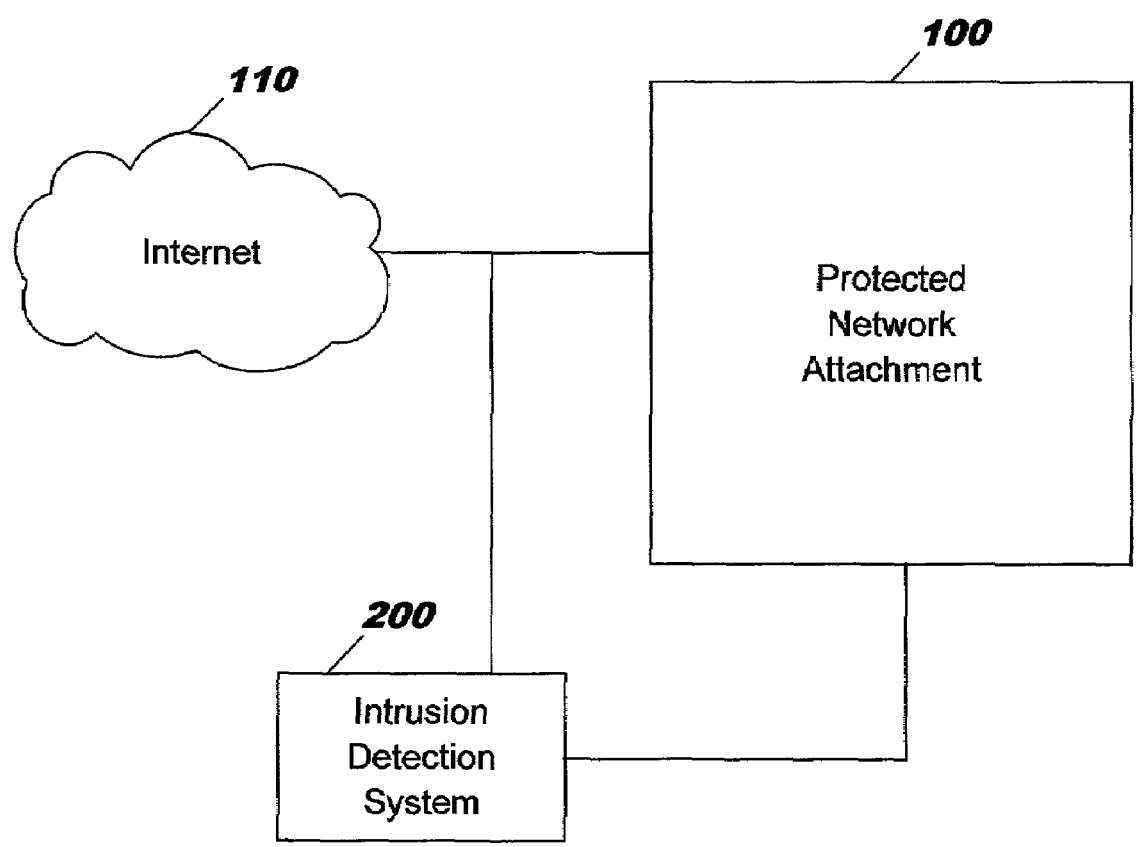
FIG. 1 shows an environment suitable for use of the present invention.

FIG. 1 shows an exemplary environment that is suitable for use of the present invention. In FIG. 1, a protected network attachment 100 such as a computer, a server, a workstation, or other similar device is connected to the Internet 110 or other communication network. Messages flow to the protected network attachment 100 from sources (not shown) which may also be connected to the Internet 110 or other communication network, or which may be local to the protected network attachment 110. Some of these messages may constitute an attempt to intrude upon the protected network attachment 100, such as an attempt to steal information held by the protected network attachment 100, or to alter information held by the protected network attachment 100, or to impede the protected network attachment 100 by implanting a virus or by filling the protected network attachment 100 with bogus messages, or otherwise to gain entry into the protected network attachment 100 or to impede the operation of the protected network attachment 100.

FIG. 1 shows also an intrusion detection system 200, the purpose of which is to guard against such intrusions. Although the present invention is described here—for purposes of clarity—in the context of an intrusion detection system that protects a protected network attachment from messages that flow from a network into the protected network attachment, it is not a necessary condition of the invention that either the protected network attachment 100 or the intrusion detection system 200 be literally connected to a network. Rather, the present invention applies as well to other kinds of intrusion detection systems that observe other aspects of a computer system, including host-based intrusion detection systems, application-based intrusion detection systems, and so forth.

Figure 2:
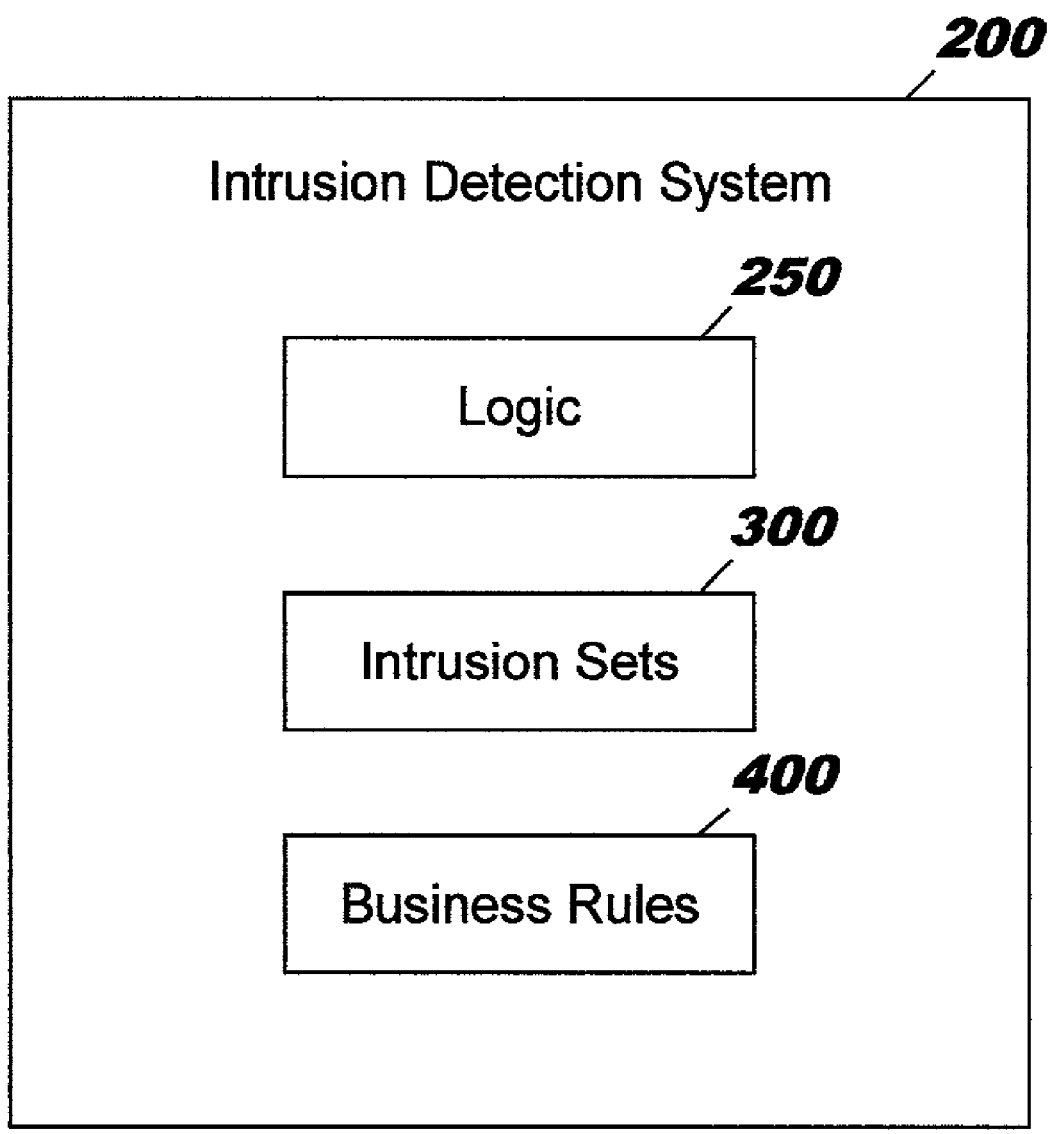
FIG. 2 shows aspects of the structure of an intrusion detection system according to the present invention.

FIG. 2 shows aspects of the structure of an intrusion detection system 200 according to the present invention. As shown in FIG. 2, the inventive intrusion detection system 200 includes logic 250 which may be a programmable processor and which oversees the operation of the intrusion detection system 200, intrusion sets 300 (described more fully below), and business rules 400 (described more fully below). The particular structure of FIG. 2 is shown for clarity rather than limitation, and the invention encompasses other related structures as well as the particular structure of FIG. 2. For example, although FIG. 2 shows the intrusion sets 300 and the business rules 400 as separate and internal to the intrusion detection system 200, either may be external to the intrusion detection system 200, for example incorporated instead into an external database. Also, the intrusion sets 300 and the business rules 400 may be combined as a single structure, which single structure may be either internal or external to the intrusion detection system 200.

Figure 3:
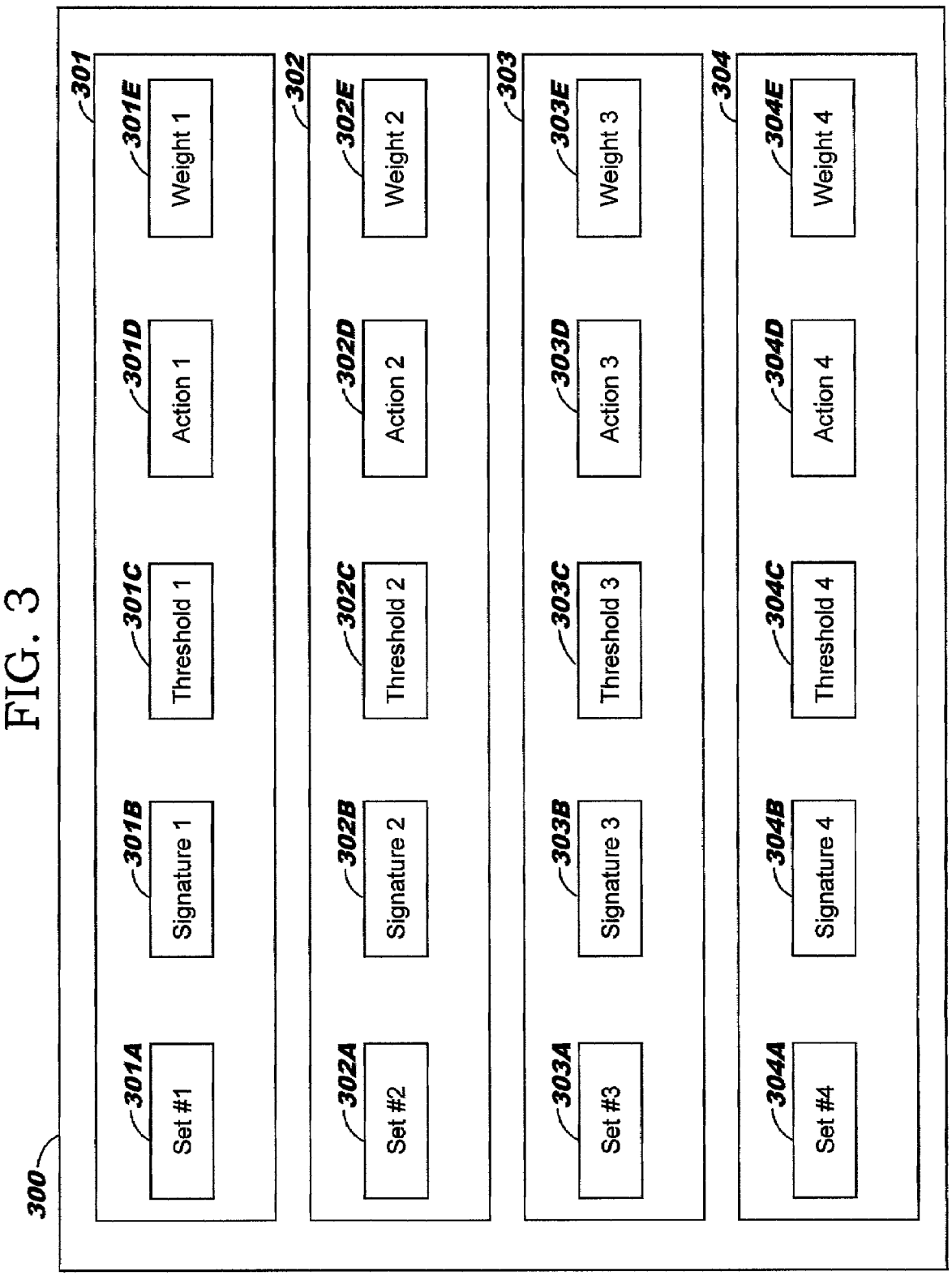
FIG. 3 shows an illustrative structure of a set of intrusion sets available to the intrusion detection system of FIG. 2.

FIG. 3 illustrates an exemplary structure of the collected intrusion sets 300, wherein four individual intrusion sets 301 through 304 are shown. The number four is selected here only for purposes of illustration; the present invention encompasses numbers of individual intrusion sets both greater than four and less than four as well as equal to four. As shown in FIG. 3, the individual intrusion sets 301 through 304 may include set identifiers 301A through 304A, signatures 301B through 304B, thresholds 301C through 304C, actions 301D through 304D, and weights 301E through 304E.

Within the individual intrusion sets 301 through 304 of FIG. 3, the set identifiers 301A through 304A may include alphanumeric tags, such that no two of the individual intrusion sets 301 through 304 have set identifiers 301A through 301D with equal alphanumeric values.

Within the individual intrusion sets 301 through 304 of FIG. 3, the signatures 301B through 304B may include bit patterns or other identifiers identified with attempted intrusions. For example, one of the signatures 301B through 304B might be a bit pattern associated with the event "logon-password failure." Another of the signatures 301B through 304B might be a bit pattern associated with the event "arrival of a message from source ID aaa.bbb.cc.ddd," where the specified source ID is known to have been used in the past by a hacker.

Within the individual intrusion sets 301 through 304 of FIG. 3, the thresholds 301C through 304C may include decision-level information, frequency-of-occurrence stipulations, and count-reset instructions associated with a signature. Decision-level information may be a numerical value, for example "ten or more occurrences of the signature." Frequency-of-occurrence stipulations may be temporal, for example "in sixty minutes or less." Reset instructions may be instructions for re-setting a count that is to be compared with the decision-level information, for example "reset signature count upon ten occurrences" or "reset signature count every sixteen minutes."

Within the individual intrusion sets 301 through 304 of FIG. 3, the actions 301D through 304D may include instructions in either natural language that is suitable for use by a system administrator or in data processing language that is suitable for use by an automated network management system. Examples of such instructions may be "lock-out user account WSM-3," or "send red alert to system administrator," or "record event in logbook," and so forth.

Within the individual intrusion sets 301 through 304 of FIG. 3, the weights 301E through 304E may include numerical or other indicators of the importance of the suspected intrusion. For example, suspected intrusions might be classified according to a three part scheme—those of low importance and therefore low numerical weight, which might give rise to a "blue alert" that might be recorded in a logbook without further action; those of moderate importance and therefore mid-range numerical weight, which might give rise to a "yellow alert" that might be sent to a network administrator; and those of high importance and therefore high numerical weight, which might give rise to a "red alert" that results in a twenty-four hour page of a chief security officer.

Figure 4:
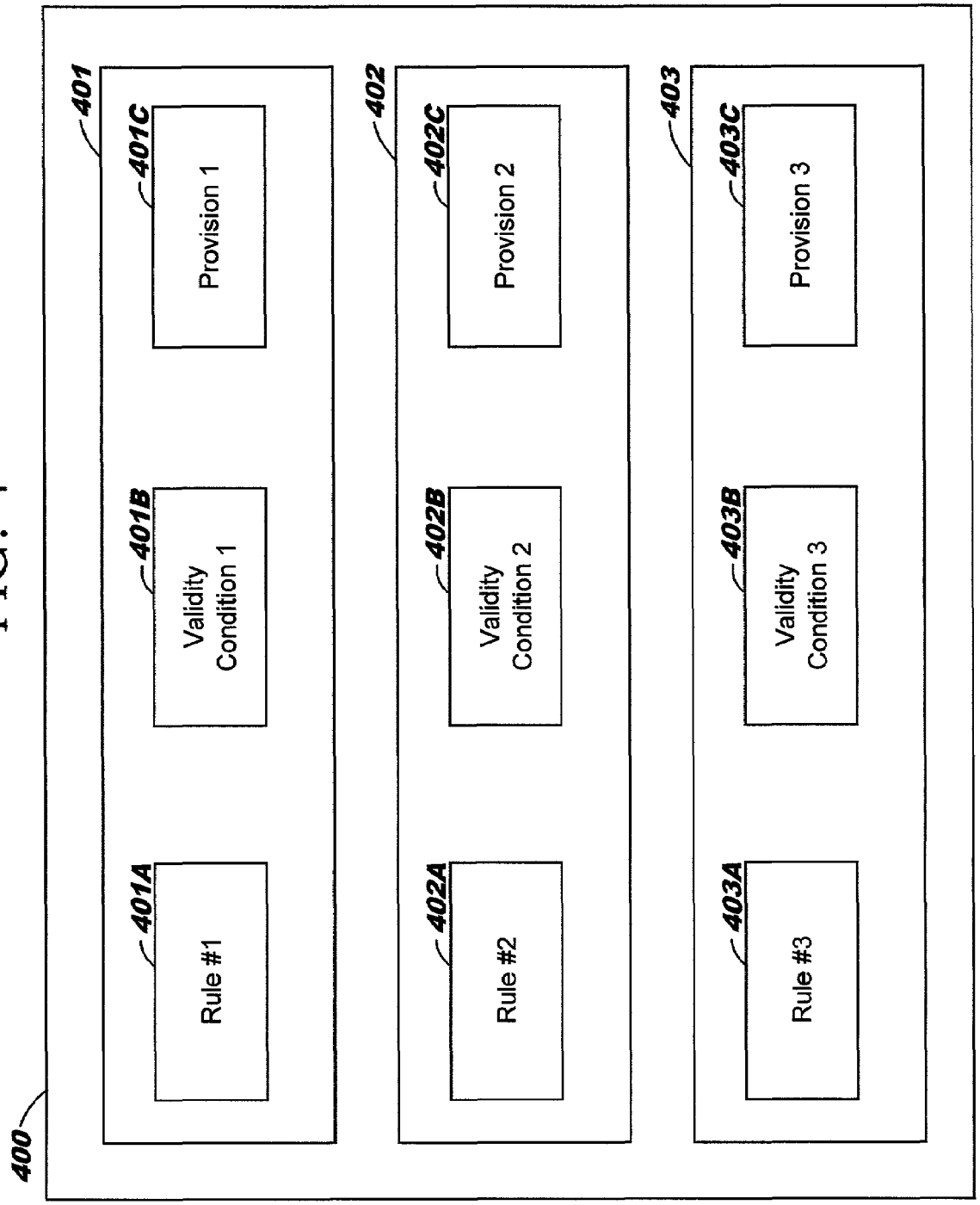
FIG. 4 shows an illustrative structure of a set of business rules available to the intrusion detection system of FIG. 2.

FIG. 4 illustrates an exemplary structure of the collected business rules 400, wherein three individual rules 401 through 403 are shown. The number three is chosen here for illustration, and the invention may accommodate more than three or fewer than three individual rules as well as exactly three. As shown in FIG. 4, the individual rules 401 through 403 may include rule identifiers 401A through 403A, validity conditions 401B through 403B under which provisions of the rules are operative, and provisions 401C through 403C, which are alterations to be imposed upon the intrusion sets 300 subject to the satisfaction or the logical truth of the validity conditions 401B through 403B.

Within the individual business rules 401 through 403 of FIG. 4, the rule identifiers 401A through 403A may be alphanumeric tags associated with the rules, for example to provide convenience when editing the rules.

Within the individual business rules 401 through 403 of FIG. 4, the validity conditions 401B through 403B may include temporal specifications such as time of day, intervals of times of the day, particular days of the week such as every Wednesday or every weekend, otherwise unrelated calendar events that are listed explicitly by date and time, particular days such as holidays, and so forth. Validity conditions that include temporal specifications are called temporal validity conditions. For example, a temporal validity condition may be "operative during weekends," or "operative every second Wednesday and fourth Thursday of a month," or "not operative during normal business hours," and so forth.

Also, the validity conditions 401B through 403B may include network-descriptive specifications, where the term "network" is used in the definition of "network-descriptive specification" in a broad sense that includes characteristics of the device under the protection of the intrusion detection system and characteristics of those who use or attempt to use the protected device, as well as characteristics of any communication network to which the protected device might be operably attached or connected. For example, network-descriptive specifications may include indications of light local loading or light network traffic, indications of heavy network traffic or local loading, identities of accounts or machines under the protection of the intrusion detection system, and so forth. A validity condition that includes a network-descriptive specification is called a network validity condition. For example, a network validity condition may be "operative during periods of light incoming network traffic," or "operative during periods of heavy loading," or "operative when both systems RALVM6 and RALVM8 are heavily loaded," and so forth.

Further, validity conditions may be compound or Boolean, and include multiple temporal specifications, or multiple network-descriptive specifications, or both temporal and network-descriptive specifications. Such validity conditions are called compound validity conditions. For example, a compound validity condition may be "operative during weekends and periods of heavy network traffic," or "operative during weekends or periods of light loading."

Within the individual business rules 401 through 403 of FIG. 4, the provisions 401C through 403C are alterations to be imposed upon the intrusion sets 300. Alterations may be imposed upon the signatures 301B through 304B, the thresholds 301C through 304C, the actions 301D through 304D, or the weights 301E through 304E of the individual intrusion sets 301 through 304. For example, one of the provisions 401C through 403C might be "set the signature of individual intrusion set number 3 to bit pattern hexadecimal AE30B4," or "set the decision value of the threshold of individual intrusion set number 4 as five occurrences of the signature," or "set the action of individual intrusion set number 1 to issue red-alert," or "set the weight of individual intrusion set number 2 to the value six."

Figure 5:
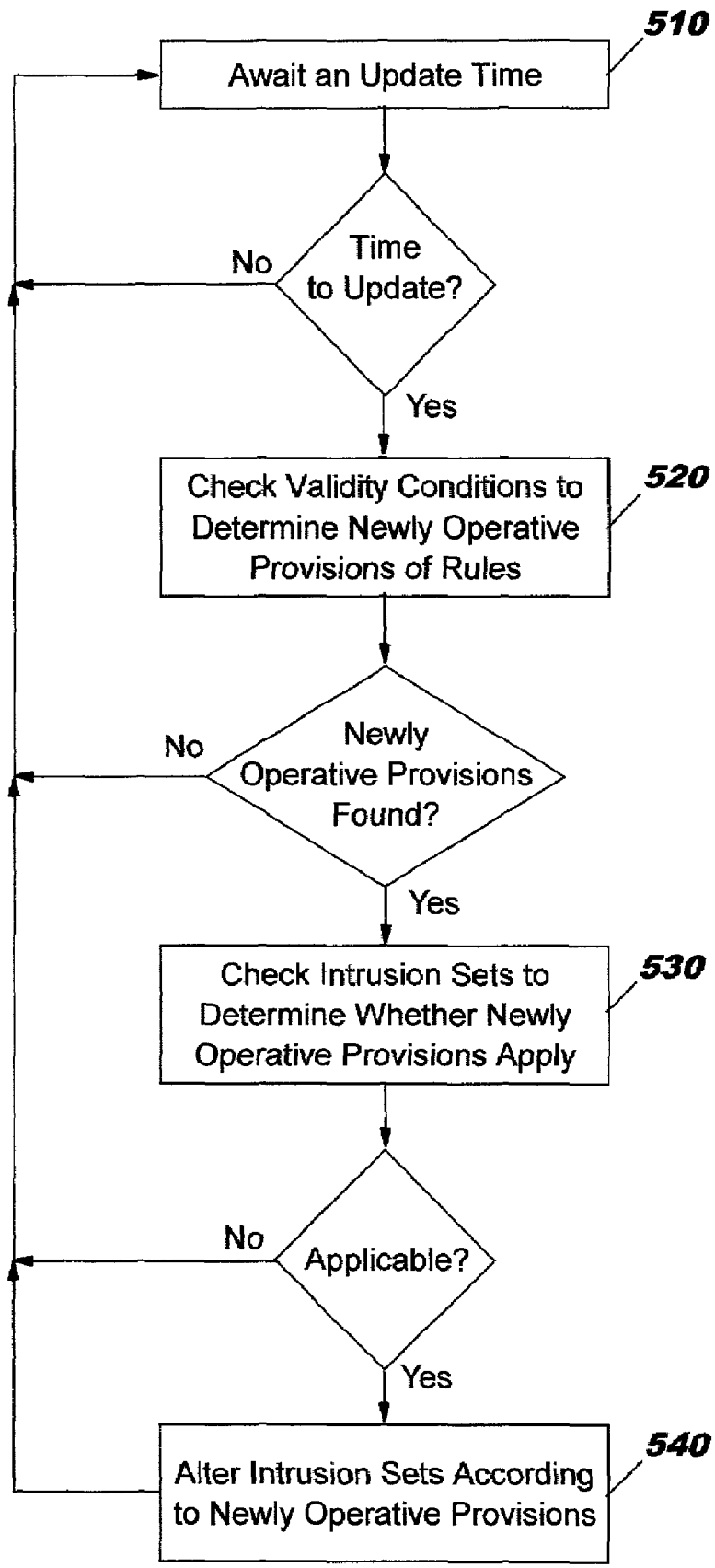
FIG. 5 shows aspects of the operation of the intrusion detection system of FIG. 2 according to the present invention.

FIG. 5 shows aspects of the operation of the logic 250 of the intrusion detection system 200 according to the present invention. The intrusion detection system 200 awaits the occurrence of an update time (step 510). An update time may be a scheduled time such as 18:00 universal time, Aug. 1, 2001; or one of a plurality of update times that occur according to a predetermined schedule, such as at 6:00, 9:30, 11:45, 14:00, and 18:00 universal time on specified days or on every day; or periodically, for example every fifteen minutes, or once every morning, or on the first day of every month. Also, an update time may be a time that is computed in dependence upon network-descriptive specifications. For example, "update every four hours when network traffic is light, and every two hours when traffic is heavy," wherein light and heavy might be defined with respect to a network trunk utilization threshold of rho=0.6. Such update times are called here computed update times.

Until an update time occurs, the intrusion detection system 200 continues to wait (step 510). When an update time occurs, the validity conditions 401B through 403B of the business rules 400 are checked, to determine whether any of the provisions 401C through 403C has come into effect since the last update time (step 520). A provision that has come into effect since the last update time is called here a newly operative provision. If none of the provisions 401C through 403C is a newly operative provision, the intrusion detection system 200 returns to the wait state (step 510). Otherwise (i.e., one of the provisions 401C through 403C is a newly operative provision), the intrusion sets 300 are checked to determine whether the newly operative provision applies to any of the individual intrusion sets 301 through 304, and the individual intrusion sets 301 through 304 to which the provision applies are identified (step 530).

If the newly operative provision is found not to apply to any of the individual intrusion sets 301 through 304 of-record at the particular update time, the intrusion detection system returns to the wait state (step 510). Otherwise (i.e., the newly operative provision applies to at least one of the individual intrusion sets 301 through 304), the individual intrusion set to which the newly operative provision applies is altered in accord with the newly operative provision (step 540). The intrusion detection system 200 then returns to the wait state (step 510).

From the foregoing description, those skilled in the art will appreciate that the present invention improves the performance of an intrusion detection system by allowing the intrusion detection system to use the best available information, in particular by modifying the system's intrusion sets according to business rules. The foregoing description is illustrative rather than limiting, however, and the scope of the present invention is limited only by the following claims.

We claim:

1. A method of operating an intrusion detection system for detecting an intrusion of a protected network attachment according to at least one business rule, said method comprising the steps of:

awaiting an occurrence of a next update time of the intrusion detection system, said next update time being a time at which at least one validity condition of the at least one business rule is checked;

responsive to the occurrence of the next update time, checking the at least one validity condition of the at least one business rule to determine whether a provision of any business rule of the at least one business rule is a newly operative provision that has first become operative or gone into effect since an occurrence of a last previous update time at which the at least one validity condition of the at least one business rule was checked, said newly operative provision prescribing an alteration of an intrusion set that the provision applies to;

if the checked provision is the newly operative provision that applies to the intrusion set, then altering the intrusion set according to the newly operative provision.

2. The method of claim 1, wherein the validity condition is a temporal validity condition.

3. The method of claim 1, wherein the validity condition is a network validity condition.

4. The method of claim 1, wherein the validity condition includes a multiple temporal specification, a multiple network-descriptive specification, or a multiple temporal specification and a multiple network-descriptive specification.

5. A method of operating an intrusion detection system according to a set of business rules, comprising the steps of:
awaiting an update time of the intrusion detection system;
responsive to occurrence of an update time, checking validity conditions of the set of business rules to determine whether a provision of any of the set of business rules is a newly operative provision;
for each newly operative provision, checking an intrusion set to determine whether the newly operative provision applies to the intrusion set; and
if the new provision applies to the intrusion set, altering the intrusion set according to the newly operative provision.

6. The method of claim 5, wherein the step of altering the intrusion set includes the step of altering a signature of the intrusion set.

7. The method of claim 5, wherein the step of altering the intrusion set includes the step of altering a threshold of the intrusion set.

8. The method of claim 5, wherein the step of altering the intrusion set includes the step of altering an action of the intrusion set.

9. The method of claim 5, wherein the step of altering the intrusion set includes the step of altering a weight of the intrusion set.

10. The method of claim 5, wherein the update time is a scheduled time.

11. The method of claim 5, wherein the update time is one of a plurality of update times that occur substantially periodically.

12. The method of claim 5, wherein the update time is a computed update time.

13. The method of claim 1, wherein the at least one business rule consists of exactly one business rule.

14. The method of claim 1, wherein the at least one business rule consists of a plurality of business rules.

15. The method of claim 1, wherein the protected network attachment comprises a computer, a server, a workstation, or a combination thereof.

16. The method of claim 1, wherein the next update time is a scheduled time.

17. The method of claim 1, wherein the next update time is one update time of a plurality of update times that occur substantially periodically.

18. The method of claim 1, wherein the next update time is a computed update time.

19. The method of claim 1, wherein the step of altering the intrusion set includes the step of altering a signature of the intrusion set.

20. The method of claim 1, wherein the step of altering the intrusion set includes the step of altering a threshold of the intrusion set.

21. The method of claim 1, wherein the step of altering the intrusion set includes the step of altering an action of the intrusion set.

22. The method of claim 1, wherein the step of altering the intrusion set includes the step of altering a weight of the intrusion set.

* * * * *

UNITED STATES PATENT AND TRADEMARK OFFICE
CERTIFICATE OF CORRECTION

PATENT NO. : 7,036,148 B2  
APPLICATION NO. : 09/851286  
DATED : April 25, 2006  
INVENTOR(S) : Brock et al.

It is certified that error appears in the above-identified patent and that said Letters Patent is hereby corrected as shown below:

On the Title Page  
In the two places the inventor is mentioned, delete "Brook" and insert -- Brock --

Signed and Sealed this

Eighteenth Day of July, 2006

JON W. DUDAS  
*Director of the United States Patent and Trademark Office*